United States Patent

Schwarzenbach et al.

[11] 3,914,344
[45] Oct. 21, 1975

[54] PHOSPHORIC ACID ANILIDES

[75] Inventors: Kurt Schwarzenbach, Pfeffingen; Siegfried Rosenberger, Riehen, both of Switzerland

[73] Assignee: Ciba-Geigy Corporation, Ardsley, N.Y.

[22] Filed: Mar. 20, 1974

[21] Appl. No.: 452,907

[30] Foreign Application Priority Data
Mar. 27, 1973 Switzerland.......................... 4402/73

[52] U.S. Cl........... 260/953; 260/45.85; 260/45.9 R; 260/936; 260/937; 260/941; 260/984
[51] Int. Cl.²............................................ C07F 9/24
[58] Field of Search ............ 260/936, 937, 941, 953

[56] References Cited
UNITED STATES PATENTS

| | | | |
|---|---|---|---|
| 3,310,575 | 3/1967 | Spivack............................ | 260/953 X |
| 3,565,855 | 2/1971 | Meltsner.......................... | 260/953 X |
| 3,767,733 | 10/1973 | Dulog et al. ........................ | 260/937 |

*Primary Examiner*—Richard L. Raymond
*Attorney, Agent, or Firm*—Charles W. Vanecek

[57] ABSTRACT

Compounds of the formula

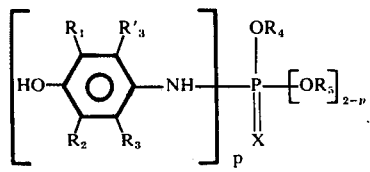

in which $R_1$ is a straight-chain or branched alkyl group, a cycloalkyl group or an aralkyl group, $R_2$ is hydrogen, a straight-chain or branched alkyl group, a cycloalkyl group or an aralkyl group, $R_3$ and $R_3'$ independently of one another are hydrogen or a lower alkyl group, $R_4$ and $R_5$ independently of one another are a straight-chain or branched alkyl group, a cycloalkyl group, a halogenoalkyl group, an alkylthioalkyl group, an alkoxyalkyl group, an alkoxycarbonylalkyl group, an alkenyl group, the phenyl group, the chlorophenyl group, an alkylphenyl group or an aralkyl group or $R_4$ and $R_5$ together are alkylene, o-arylene or the

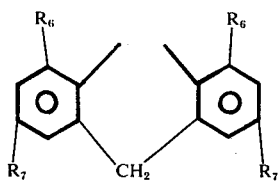

group wherein $R_6$ and $R_7$ are lower alkyl groups, X is oxygen or sulphur and $p$ is 1 or 2, are stable compounds and useful stabilizers for organic material.

The stabilizers are prepared by reacting a corresponding p-hydroxyaniline with a chloride of a phosphoric acid ester.

10 Claims, No Drawings

PHOSPHORIC ACID ANILIDES

The present invention relates to new compounds, the method for their manufacture, their use for stabilising organic material against thermo-oxidative degradation, and the organic material stabilised with the aid of these compounds.

It is known to employ derivatives of sterically hindered phenols as stabilisers for plastics, against thermooxidative or photo-induced degradation. It is also known to employ phosphorus derivatives of sterically hindered phenols, phosphites and phosphonates being of outstanding importance.

It is also very usual to employ phosphorus compounds as co-stabilisers in a mixture with phenolic antioxidants for stabilisation and such mixtures frequently show a synergistic effect. The stabilising effect of this class of compounds or mixtures is however frequently insufficient to suppress the degradation of the plastics for a prolonged period under use conditions. Furthermore, phosphoric acid esters and phosphorous acid esters are easily hydrolysable compounds which makes them more difficult to store and leads to acid decomposition products which can, in turn, promote the degradation of polymer materials. It has now been found that new compounds of the general formula I

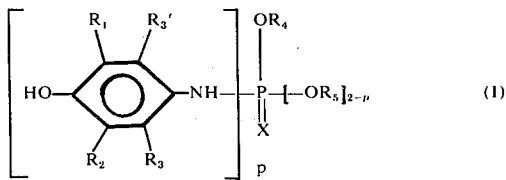

in which $R_1$ denotes a straight-chain or branched alkyl group, a cycloalkyl group or an aralkyl group, $R_2$ denotes hydrogen, a straight-chain or branched alkyl group, a cycloalkyl group or an aralkyl group, $R_3$ and $R_3'$ independently of one another denote hydrogen or a lower alkyl group, $R_4$ and $R_5$ independently of one another denote a straight-chain or branched alkyl group, a cycloalkyl group, a halogenoalkyl group, an alkylthioalkyl group, an alkoxyalkyl group, an alkoxycarbonylalkyl group, an alkenyl group, the phenyl group, the chlorophenyl group, an alkylphenyl group or an aralkyl group or $R_4$ and $R_5$ together denote alkylene, o-arylene or the

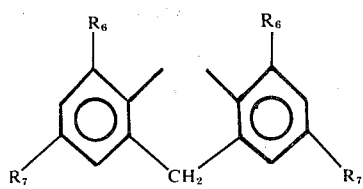

group wherein $R_6$ and $R_7$ denote lower alkyl groups, X denotes oxygen or sulphur and $p$ denotes 1 or 2, surprisingly are stable compounds which can be stored and the action of which, as stabilisers, is substantially better than that of the abovementioned sterically hindered phenols containing phosphorus.

Preferred compounds of the formula I are those in which $R_1$ denotes alkyl with 1 to 8 carbon atoms, cycloalkyl with 6 to 8 carbon atoms or aralkyl with 7 to 9 carbon atoms, $R_2$ denotes hydrogen, alkyl with 1 to 8 carbon atoms, cycloalkyl with 6 to 8 carbon atoms or aralkyl with 7 to 9 carbon atoms, $R_3$ denotes hydrogen or methyl, $R_3'$ denotes hydrogen, $R_4$ and $R_5$ independently of one another denote alkyl with 1 to 22 carbon atoms, cycloalkyl with 5 to 8 carbon atoms, halogenoalkyl with 2 to 18 carbon atoms, alkylthioalkyl with 3 to 21 carbon atoms, alkoxyalkyl with 3 to 21 carbon atoms, alkenyl with 3 to 4 carbon atoms, phenyl, alkylphenyl with 7 to 14 carbon atoms or aralkyl with 7 to 15 carbon atoms or $R_4$ and $R_5$ together denote ethylene or o-phenylene, X denotes oxygen or sulphur and p denotes 1 or 2.

Particularly preferred compounds are those of the formula I in which $R_1$ and $R_2$ independently of one another denote alkyl with 1 to 5 carbon atoms, especially isopropyl or tert.butyl, or cycloalkyl with 6 to 8 carbon atoms, $R_3$ denotes hydrogen or methyl, $R_3'$ denotes hydrogen, $R_4$ and $R_5$ denote alkyl with 1 to 8 carbon atoms, cyclohexyl, phenyl, alkylphenyl with 7 to 14, especially 7 to 10, carbon atoms, or benzyl, X denotes oxygen or sulphur and p denotes 1.

A particular group of compounds are those in which, in the formula I, $R_1$ denotes alkyl with 1 to 4 carbon atoms, $R_2$ denotes alkyl with 3 or 4 carbon atoms, $R_3$ and $R_3'$ denote hydrogen, $R_4$ and $R_5$ denote alkyl with 1 to 18 carbon atoms, phenyl, chlorophenyl, benzyl or —$CH_2COOC_2H_5$, $R_4$ and $R_5$ together denote ethylene, X denotes oxygen or sulphur and $p$ denotes 1 or 2.

In the definition of the compounds of the formula I, $R_1$, $R_2$, $R_4$ and/or $R_5$ can be alkyl such as, for example, methyl, ethyl, iso-propyl, butyl, sec.butyl, tert.butyl, amyl, tert.-amyl, sec.amyl, hexyl, octyl, 1,1,3,3-tetramethylbutyl, decyl, dodecyl, tetradecyl, hexadecyl, octadecyl, eicosyl or dococsyl and $R_3$, $R_3'$, $R_6$ and/or $R_7$ can denote a lower alkyl, for example an alkyl with 1 to 4 carbon atoms, such as methyl, ethyl, n-propyl, iso-propyl, n-butyl, isobutyl or tert.butyl.

$R_1$, $R_2$, $R_4$ and/or $R_5$ can also be a cycloalkyl group, such as, for example, cyclopentyl, cyclohexyl, α-methylcyclohexyl or cyclooctyl or an aralkyl group such as benzyl, α-phenylethyl or α,α--dimethylbenzyl, If $R_4$ and $R_5$ denote halogenoalkyl they can preferably be chloroalkyl or bromoalkyl, such as 2-chloroethyl, 2-bromoethyl or 2-chlorobutyl, When $R_4$ and $R_5$ denote alkoxyalkyl they can be, for example, 3-oxabutyl, 3-oxapentyl, 3-oxaheptyl, 3-oxapentadecyl or 3-oxaheneicosyl, whilst if $R_4$ and $R_5$ denote alkylthioalkyl they can be, for example 3-thiabutyl, 3-thiapentyl, 3-thiaheptyl, 3-thiaundecyl, 3-thiapentadecyl, 3-thianonadecyl and 3-thiaheneicosyl.

As alkenyl, $R_4$ and $R_5$ can denote propenyl or butenyl and as alkylphenyl they can denote, for example, methylphenyl, ethylphenyl, iso-propylphenyl, butylphenyl, sec.butylphenyl, tert.butylphenyl, amylphenyl, tert.amylphenyl, sec.amylphenyl, hexylphenyl, octylphenyl or 1,1,3,3-tetramethylbutylphenyl.

As o-arylene, $R_4$ and $R_5$ can preferably be o-arylene with 6 to 10 carbon atoms such as o-phenylene, 3-tert.butyl-1,2-phenylene, 1,2-naphthylene, 2,3-naphthylene or 1,8-naphthylene and as alkoxycarbonylalkyl $R_4$ and $R_5$ can preferably be alkoxycarbonylalkyl with 3 to 5 carbon atoms, such as ethoxycarbonylmethyl or ethoxycarbonylethyl.

If the radicals $R_4$ and $R_5$ in the definition of the formula I are together an alkylene radical, it can be 1,2-alkylene or 1,3-alkylene such as, for example, ethylene, 1,2-propylene or 1,3-propylene.

Examples of compounds of the formula I are: 2-(3,5-di-tert.butyl-4-hydroxyanilino)-2-oxo-benzo-1,3,2-dioxaphospholine, phosphoric acid dicyclohexyl ester 3,5-di-tert. butyl-4-hydroxyanilide, phosphoric acid di(2-chloroethyl ester) 3,5-di-tert.butyl-4-hydroxyanilide, phosphoric acid di(3-thiaundecyl) ester 3,5-di-tert.butyl-4-hydroxyanilide, phosphoric acid di(3-thiapentadecyl) ester 3,5-di-tert.butyl-3-hydroxyanilide, phosphoric acid di(3-thiaheneicosyl) ester 3,5-di-tert.butyl-4-hydroxyanilide, phosphoric acid di(3-oxaheptyl) ester 3,5-di-tert.butyl-4-hydroxyanilide, phosphoric acid diallyl ester 3,5-di-tert.butyl-4-hydroxyanilide, phosphoric acid di-m-toluyl ester 3,5-di-tert.butyl-4-hydroxyanilide, phosphoric acid di-p-tert.octylphenyl ester 3,5-di-tert.butyl-4-hydroxyanilide, 2-(3,5-di-tert.butyl-4-hydroxyanilino)-2-oxo-1,2-naphtho-1,3,2-dioxaphospholine, 2-(3,5-di-tert.butyl-4-hydroxyanilino-2-oxo-1,8-naphtho-1,3,2-dioxaphospholine, 2-(3,5-di-tert.butyl-4-hydroxyanilino)-2-thiobenzo-1,3,2-dioxaphospholine, thiophosphoric acid 0,0-diphenyl ester 3,5-di-tert.butyl-4-hydroxyanilide, phosphoric acid dibenzyl ester 3,5-di($\alpha$-phenylethyl)-4-hydroxyanilide and phosphoric acid dibutyl ester 3,5-di-ter.amyl-4-hydroxyanilide.

The compounds of the formula I are manufactured by reacting p mols of a compound of the general formula II

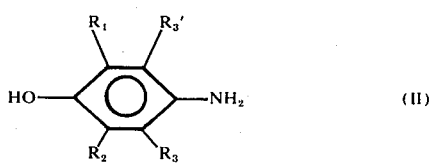

wherein $R_1$, $R_2$, $R_3$ and $R_3'$ have the same meaning as in the formula I, with one mole of a compound of the general formula III

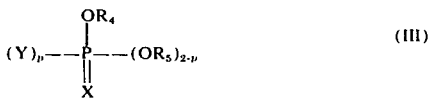

wherein $R_4$, $R_5$, $p$ and X have the same meaning as in the formula I and Y is halogen, preferably chlorine. Advantageously, $p$ mols, or an excess, of a tertiary amine such as triethylamine, triisopropylamine or pyridine are added to neutralise the hydrogen halide acid produced. If the said base is employed in excess, it can be used direct as the solvent. Examples of further possible solvents in which the reaction can be carried out are: dimethylacetamide, dimethylformamdie, tetrahydrofurane, diethyl ether or dioxane; alcohols such as methanol, ethanol or isopropanol, ketones and esters such as acetone, methyl ethyl ketone or ethyl acetate, aromatic hydrocarbons such as benzene or toluene, aliphatic hydrocarbons and mixtures such as hexane, heptane or ligroin.

The starting products are known or can be manufactured easily in accordance with generally known methods.

The compounds of the formula I are used as stabilisers for organic substrates. Examples of possible substrates are:

1. Polymers which are derived from hydrocarbons with single or double unsaturation, such as polyolefines, such as, for example polyethylene, which can optionally be crosslinked, polypropylene, polyisobutylene, polymethylbutene-1, polymethylpentene-1, polybutene-1, polyisoprene, polybutadiene, polystyrene, polyisobutylene, copolymers of the monomers on which the homopolymers mentioned are based, such as ethylene-propylene copolymers, propylene-butene-1 copolymers, propylene-isobutylene copolymers, styrene-butadiene copolymers and terpolymers or ethylene and propylene with a diene, such as, for example, hexadiene, dicyclopentadiene or ethylidenenorbornene; mixtures of the abovementioned homopolymers, such as, for example, mixtures of polypropylene and polyethylene, polypropylene and polybutene-1 and polypropylene and polyisobutylene.

2. Vinyl polymers containing halogen, such as polyvinyl chloride, polyvinylidene chloride and polyvinyl fluoride, but also polychloroprene and chlorinated rubbers.

3. Polymers which are derived from $\alpha,\beta$-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylic ester copolymers.

4. Polymers which are derived from unsaturated alcohols and amines or their acyl derivatives or acetals, such as polyvinyl alcohol, polyvinyl acetate, polyvinyl steartate, polyvinyl benzoate, polyvinyl maleate, polyvinyl butyral, polyallyl phthalate, polyalymelamine and their copolymers with their vinyl compounds, such as ethylene/vinyl acetate copolymers.

5. Homopolymers and copolymers which are derived from epoxides, such as polyethylene oxide or the polymers which are derived from bis-glycidyl ethers.

6. Polyacetals, such as polyoxymethylene and polyoxyethylene, as well as polyoxymethylenes which contain ethylene oxide as the comonomer.

7. Polyphenylene oxides.
8. Polyurethanes and polyureas.
9. Polycarbonates.
10. Polysulphones.
11. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.
12. Polyesters which are derived from dicarboxylic acids and dialcohols and/or from hydroxycarboxylic acids or the corresponding lactones, such as polyethylene glycol terephthalate and poly-1,4-dimethylolcyclohexane terephthalate.
13. Crosslinked polymers which are derived from aldehydes on the one hand and phenols, ureas and melamines on the other, such as phenol-formaldehyde, urea-formaldehyde and melamineformaldehyde resins.
14. Alkyd resins, such as glycerine-phthalic acid resins and their mixtures with melamine-formaldehyde resins.
15. Unsaturated polyester resins which are derived from copolyesters of saturated and unsaturated dicarboxylic acids with polyhydric alcohols, with vinyl compounds as crosslinking agents, and also their halogen-containing modifications of low inflammability.
16. Natural polymers such as cellulose, rubber, proteins and their polymer-homologously chemically modified derivatives, such as cellulose acetates, cellulose propionates and cellulose butyrates, or the cellulose ethers, such as methylcellulose.

17. Natural and synthetic organic materials which are pure monomeric compounds or mixtures of such compounds, for example mineral oils, animal and vegetable fats, oils and waxes, or oils, waxes and fats based on synthetic esters, as well as mixtures of synthetic esters with mineral oils in any desired proportion by weight.

The compounds of the formula I are incorporated into the substrates in a concentration of 0.005 to 5% by weight, calculated relative to the material to be stabilised.

Preferably, 0.01 to 1.0, and particularly preferentially 0.02 to 0.5, % by weight of the compounds, calculated relative to the material to be stabilised, are incorporated into the latter. The incorporation can take place, for example, by mixing in at least one of the compounds of the formula I and optionally further additives in accordance with the methods customary in the art, before or during moulding, or by applying the dissolved or dispersed compounds to the polymer, if necessary with subsequent evaporation of the solvent.

In the case of crosslinked polyethylene, the compounds are added before crosslinking.

The compounds of the formula I can also be added before or during the polymerisation, and a possible incorporation into the polymer chain can give stabilised substrates in which the stabilisers are neither volatile nor extractable.

The following should be mentioned as examples of further additives together with which the stabilisers can be employed:

1. Antioxidants 1.1. Simple 2,6-dialkylphenols, such as, for example, 2,6-di-tert.-butyl-4-methylphenol, 2-tert.-butyl-4,6-dimethylphenol, 2,6-di-ter.-butyl-4-methoxymethylphenol and 2,6-dioctadecyl-4-methylphenol.

1.2. Derivatives of alkylated hydroquinones, such as, for example, 2,5-di-tert.-butyl-hydroquinone, 2,5-di-tert.-amylhydroquinone, 2,6-di-tert.-butyl-hydroquinone, 2,5-di-tert.-butyl-4-hydroxy-anisole, 3,-5-di-tert.-butyl-4-hydroxy-anisole, tris(3,5-di-tert.-butyl-4-hydroxyphenyl) phosphite, 3,5-tert.-butyl-4-hydroxyphenyl stearate and bis-(3,5-di-tert.-butyl-4-hydroxyphenyl) adipate.

1.3. Hydroxylated thiodiphenyl ethers, such as, for example, 2,2'-thio - bis-(6-tert.-butyl-4-methylphenol), 2,2'-thio-bis-(4-octylphenol), 4,4'-thio-bis-(6-tert.-butyl-3-methylphenol, 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl)-disulphide.

1.4. Alkylidene-bisphenols, such as, for example, 2,2'-methylene-bis-(6-tert.-butyl-4-methylphenol), 2,2'-methylene-bis-(6-tert.-butyl-4-ethylphenol), 4,4'-methylene-bis-(6-tert.-butyl-2-methylphenol), 4,4'-methylene-bis(2,6-di-tert.-butylphenol), 2,6-di-(3-tert.-butyl-5-methyl-2-hydroxybenzyl)-4-methylphenol, 2,2'-methylene-bis[4-methyl-6-(α-methylcyclohexyl)-phenol], 1,1-bis-(3,5-dimethyl-2-hydroxyphenyl)-butane, 1,1'-bis-(tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercapto-butane, 1,1,5,5-tetra-(5-tert.-butyl-4-hydroxy-2-methylphenyl)-pentane and ethylene glycol bis-[3,3-bis-(3'-tert.-butyl-4'-hydroxyphenyl)-butyrate].

1.5. O-, N- and S-benzyl compounds, such as, for example, 3,5,3',5'-tetra-tert.-butyl-4,4'-dihydroxydibenzyl ether, 4-hydroxy-3,5-dimethylbenzyl-mercaptoacetic acid octadecyl ester, tris-(3,5-di-tert.-butyl-4-hydroxybenzyl)-amine and bis-(4-tert.-butyl-3-hydroxy-2,6-dimethylbenzyl) dithioterephthalate.

1.6. Hydroxybenzylated malonic esters, such as, for example, 2,2-bis-(3,5-di-tert.-butyl-2-hydroxybenzyl)-malonic acid dioctadecyl ester, 2-(3-tert.-butyl-4-hydroxy-5-methylbenzyl)-malonic acid dioctadecyl ester, 2,2-bis-(3,5-di-tert.-butyl-4-hydroxybenzyl)-malonic acid didodecylmercaptoethyl ester and 2,2-bis(3,5-di-tert.-butyl-4-hydroxybenzyl)-malonic acid di-[4-(1,1,3,3-tetramethylbutyl)-phenyl] ester.

1.7. Hydroxybenzyl-aromatics, such as, for example, 1,3,5-tri-(3,5-di-tert.-butyl-4-hydroxybenzyl)-2,4,6-trimethylbenzene, 1,4-di(3,5-di-tert.-butyl-4-hydroxybenzyl)-2,3,5,6-tetramethylbenzene and 2,4,6-tri-(3,5-di-tert.-butyl-4-hydroxybenzyl)-phenol.

1.8. s-Triazine compounds, such as, for example, 2,4-bis-octylmercapto-6-(3,5-di-tert.-butyl-4-hydroxyanilino)-s-triazine, 2-octylmercapto-4,6-bis-(3,5-di-tert.-butyl-4-hydroxyanilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenylethyl)-s-triazine and 1,3,5-tris-(3,5-di-tert.-butyl-4-hydroxybenzyl)-isocyanurate.

1.9. Amides of β-(3,5-di-tert.-butyl-4-hydroxyphenyl)-propionic acid, such as, for example, 1,3,5-tris-(3,5-di-tert.-butyl-4-hydroxyphenyl-propionyl)-hexahydro-s-triazine and N,N'-di-(3,5-di-tert.-butyl-4-hydroxyphenyl-propionyl)-hexamethylenediamine.

1.10. Ester of β-(3,5-di-tert.-butyl-4-hydroxyphenyl)-propionic acid with monohydric or polyhydric alcohols such as, for example, with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thiaundecanol, 3-thia-pentadecanol, trimethylhexanediol, trimethylolethane, trimethylolpropane, tris-hydroxyethyl-isocyanurate and 4-hydroxymethyl-1-phospha-2,6,7-trioxabicyclo[2,2,2]-octane.

1.11 Esters of β-(5-tert.-butyl-4-hydroxy-3-methylphenyl)-propionic acid with monohydric or polyhydric alcohols such as, for example, with methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thiaundecanol, 3-thia-pentadecanol, trimethylhexanediol, trimethylolethane, trrimethylolpropane, tris-hydroxyethylisocyanurate and 4-hydroxymethyl-1-phospha-2,6,7-trioxabicyclo[2,2,2]-octane.

1.12. Esters of 3,5-di-tert.-butyl-4-hydroxyphenylacetic acid with monohydric or pholhydric alcohols such as, for example, methanol, ethanol, octadecanol, 1,6-hexanediol, 1,9-nonanediol, ethylene glycol, 1,2-propanediok, diethylene glycol, thiodiethylene glycol, neopentyl glycol, pentaerylthritol, 3-thiaundecanol, 3-thia-pentadecanol, trimethylhexanediol, trimethylolethane, trimethylolpropane, tris-hydroxyethylisocyanurate and 4-hydroxymethyl-1-phospha-2,6,7-trioxabicyclo[2,2,2]-octane.

1.13. Acylaminophenols, such as, for example, N-(3,5-di-tert.-butyl-4-hydroxyphenyl)-stearic acid amide and N,N'-di-(3,5-di-tert.-butyl-4-hydroxyphenyl)-thiobisacetamide.

1.14. Benzylphosphonates, such as, for example, 3,5-di-tert.-butyl-4-hydroxybenzyl-phosphonic acid dimethyl ester, 3,5-di-tert.-butyl-4-hydroxybenzyl-phosphonic acid diethyl ester, 3,5-di-tert.-butyl-4-hydroxybenzyl-phosphonic acid dioctadecyl ester and 5-tert.-butyl-4-hydroxy-3-methylbenzyl-phosponic acid dioctadecyl ester.

1.15. Aminoaryl derivatives, such as, for example, phenyl-1-naphthylamine, phenyl-2-naphthylamine, N,N'-diphenyl-p-phenylenediamine, N,N'-di-2-naphthyl-p-phenylenediamine, N,N'-di-2-naphthyl-p-phenylenediamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, mono- and di-octyliminiodibenzyl, polymerised 2,2,4-trimethyl-1,2-dihydroquinoline, octylated diphenylamine, nonylated diphenylamine, N-phenyl-N'-cyclohexyl-p-phenylenediamine, N-phenyl-N'-isopropyl-p-phenylenediamine, N,N'-di-sec.-octyl-p-phenylen-diamine, N-phenyl-N'-sec.-octyl-p-phenylenediamine, N,N'-di-(1,4-dimethypentyl)-p-phenylenediamine, N,N'-dimethyl-N,N'-di-(sec.-octyl)-p-phenylenediamine, 2,6-dimethyl-4-methoxy-aniline, 4-ethoxy-N-sec.-butylaniline, diphenylamine-acetone condensation product, aldol-1-naphthylamine and phenothiazine.

2. UV-absorbers and light protection agents 2.1. 2-(2'-Hydroxyphenyl)-benztriazoles, such as, for example, the 5'-methyl-, 3', 5'-di-tert.-butyl-, 5'--tert.-butyl-, 5'-(1,1,3,3-tetramethylbutyl)-, 5-chloro-3',5'-di-tert.-butyl-, 5-chloro-3'-tert.-butyl-5'-methyl, 3'-sec.-butyl-5'-tert.-butyl-, 3'-α-methylbenzyl-5'-methyl-, 3'-α-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2.2. 2.4-Bis-(2'-hydroxyphenyl)-6-alkyl-s-triazines, such as, for example, the 6-ethyl-, 6-heptadecyl- and 6-undecylderivative.

2.3. 2-Hydroxybenzophenones, such as, for example, the 4-hydroxy-, 4-methoxy-, 4-octoxy-, 4-decyloxy-, 4-dodecyloxy-, 4-benzyloxy-, 4,2',4'-trihydroxy-, and 2'-hydroxy-4,4'-dimethoxy-derivative.

2.4. 1.3-Bis-(2'-hydroxybenzoyl)-benzenes, such as, for example, 1,3-bis-(2'-hydroxy-4'-hexyloxybenzoyl)-benzene, 1,3-bis(2'-hydroxy-4'-octyloxybenzoyl)-benzene and 1,3-bis-(2'-hydroxy-4'-dodecyloxy-benzoyl)-benzene.

2.5. Esters of optionally substituted benzoic acids, such as, for example, phenyl salicylate, octylphenyl salicylate, dibenzoylresorcinol, bis-(4-tert.-butylbenzoyl)-resorcinol, benzoylresorcinol, 3,5-di-tert.-butyl-4-hydroxybenzoic acid 2,4-di-tert.-butylphenyl ester or octadecyl ester or 2-methyl-4,6-di-tert.-butylphenyl ester.

2.6. Acrylates, such as, for example, α-cyano-β,β-diphenylacrylic acid ethyl ester and isooctyl ester, α-carbomethoxycinnamic acid methyl ester, α-cyano-β-methyl-p-methoxy-cinnamic acid methyl ester and butyl ester and N-(β-carbomethoxyvinyl)-2-methylindoline.

2.7. Nickel compounds, such as, for example, nickel complexes of 2,2'-thio-bis[4-(1,1,3,3-tetramethylbutyl)-phenol], such as the 1:-1 or the 1:2 complex, optionally with additional ligands such as n-butylamine, triethanolamine or N-cyclohexyldiethanolamine, nickel complexes of bis-[2-hydroxy-4-(1,1,3,3-tetramethylbutyl)-phenyl]-sulphone,such as the 2:1 complex, optionally with additional ligands such as 2-ethylcaproic acid, nickel dibutyldithiocarbamate, nickel salts of 4-hydroxy-3,5-di-tert.-butylbenzyl-phosponic acid monoalkyl esters, such as of the methyl, ethyl or butyl ester, nickel complexes of ketoximes such as of 2-hydroxy-4-methylphenyl-undecyl ketonoxime, nickel 3,5-di-tert.-butyl-4-hydroxybenzoate and nickel isopropylxanthate.

2.8. Sterically hindered amines, such as, for example, 4-benzoyloxy-2,2,6,6-tetramethylpiperidine, 4-stearoyloxy-2,2,6,6-tetramethylpiperidine, bis-(2,2,6,6-tetramethylpiperidyl)-sebacate and 3-n-octyl-7,7,9,9-tetramethyl-1,3,8-triazaspiro[4,5]decane-2,4-dione.

2.9. Oxalic acid diamides, such as, for example, 4,4'-dioctyloxy oxanilide, 2,2'-di-octyloxy-5,5'-di-tert.-butyl-oxanilide, 2-ethoxy-2'-ethyl-oxanilide, N,N'-bis-(3-dimethylaminopropyl)-oxalamide, 2-ethoxy-5-tert.-butyl-2'-ethyl-oxanilide and its mixture with 2-ethoxy-2'-ethyl-5,4'-di-tert.-butyl-oxanilide, and mixtures of ortho- and para-methoxy- and o- and p-ethoxydisubstituted oxanilides.

3. Metal deactivators, such as, for example, oxanilide isophthalic acid dihydrazide, sebacic acid, bis-phenylhydrazide, bis-benzylidene-oxalic acid dihydrazide, N,N'-diacetyladipic acid dihydrazide, N,N'-bis-salicyloyl-oxalic acid dihydrazide, N,N'-bis-salicyloylhydrazine, N,N'-bis-(3,5-di-tert.-butyl-4-hydroxyphenylpropionyl)-hydrazine, N-salicylal-N'-salicylidenehydrazinie and 3-salicyloylamino-1,2,4-triazole.

4. Phosphites, such as, for example, triphenyl phosphite, diphenyl-alkyl phosphites, phenyl-dialkyl phosphites, tri(nonylphenyl)-phosphite, trilauryl phosphite, trioctadecyl phosphite, 3,9-di-isodecyloxy-2,4,8,10-tetroxa-3,9-diphosphaspiro[5,5]undecane and tri-(4-hydroxy-3,5-di-tert.-butylphenyl)-phosphite.

5. Compounds which destroy peroxide, such as, for example, esters of β-thio-dipropionic acid, for example the lauryl, stearyl, myristyl or tridecyl ester, mercaptobenzimidazole and the zinc salt of 2-mercaptobenzimidazole.

6. Polyamide stabilisers, such as, for example, copper salts in combination with iodides and/or phosphorus compounds and salts of divalent manganese.

7. Basic co-stabilisers, such as, for example, melamine, benzoguanamine, polyvinylpyrrolidone, dicyandiamide, triallyl cyanurate, urea derivatives, hydrazine derivatives, amines polyamides, polyurethanes, alkali metal and alkaline earth metal salts of higher fatty acids, for example Ca stearate, Zn stearate, Mg stearate, Na ricinoleate, K palmitate, antimony pyrocatecholate or tin pyrocatecholate.

8. PVC stabilisers, such as, for example, organic tin compounds, organic lead compounds and barium-cadmium salts of fatty acids.

9. Nucleating agents, such as, for example, 4-tert.-butyl-benzoic acid, adipic acid and diphenylacetic acid.

10. Urea derivatives, such as, for example, N-cyclohexyl-N'-1-naphthylurea, N-phenyl-N,N'-dicyclohexylurea, N-phenyl-N'-2-naphthylurea, N-phenylthiourea and N,N'-dibutylthiourea.

11. Other additives, such as, for example, plasticisers, lubricants, emulsifiers, fillers, carbon black, asbestos, kaolin, talc, glass fibres, pigments, optical brighteners, flameproofing agents and antistatic agents.

The manufacature and use of the compounds according to the invention is described in more detail in the examples which follow. Therein, parts denote parts by weight and % denote percentages by weight.

EXAMPLE 1 TO 8

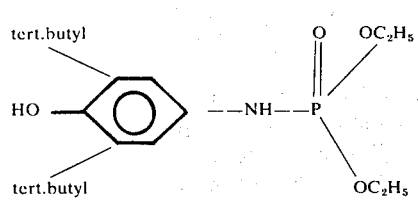

200 ml of dimethylformamide and 11 g of triethylamine are initially introduced into the reaction vessel, 22.1 g of 4 1amino-2,6-di-tert.butyl-phenol are added and 19 g of phosphoric acid diethyl ester chloride are then added dropwise whilst stirring at approx. 30°C. an exothermic reaction occurs and a precipitate appears immediately. The reaction mixture is stirred for a further 30 minutes and is then poured into 500 ml of water. The product is filtered off, washed with water, dried, recrystallised from ligroin and again dried. The phosphoric acid diethyl ester 3,5-di-tert.butyl-4-hydroxyanilide obtained in a yield of 92% melts of 162°C.

If, in the preceding example, the phosphoric acid diethyl ester chloride is replaced by an equivalent amount of one of the ester chlorides of Table 1 below, and an analogous procedure is followed, the corresponding ester-anilides of the formula shown below, having the melting points listed, are obtained:

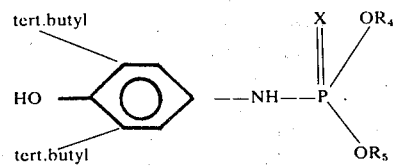

Table 1

| Example No. | $R_4/R_5$ | X | Melting point |
|---|---|---|---|
| 2 | $R_4=R_5$<br>$n-C_8H_{17}$ | O | 52°C |
| 3 | $R_4=R_5$<br>$-C_2H_5$ | S | 79°C |
| 4 | $R_4+R_5$<br>$-CH_2$<br>$\|$<br>$-CH_2$ | O | 220°C |
| 5 | $R_4=R_5$<br>$-CH_2-\langle\bigcirc\rangle$ | O | 100°C |
| 6 | $R_4=R_5$<br>$\langle\bigcirc\rangle$ | O | 145°C |
| 7 | $R_4=R_5$<br>$-CH_3$ | O | 204°C |
| 8 | $R_4=R_5$<br>$-n-C_4H_9$ | O | 126°C |

If isopropyl alcohol is used instead of dimethylformamide as the solvent in these examples, the products described are obtained in comparably good yield.

EXAMPLE 9

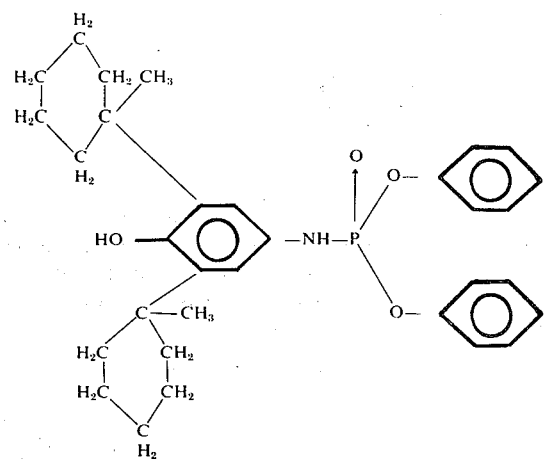

200 ml of dioxane and 11 g of triethylamine are introduced into a reaction vessel, 30.1 g of 4-amino-2,6-di-(α-methyl-cyclohexy)-phenol are added and 27 g of phosphoric acid diphenyl ester chloride are then added dropwise, whilst stirring. After 30 minutes, the reaction mixture is poured into 500 ml of water. The product which precipitates is filtered off, dried and recrystallised from ligroin. Phosphoric acid diphenyl ester 3,5-di-(α-methylcyclohexyl)-4-hydroxy-anilide is thus obtained.

If, in this example, 4-amino-2,6-di-(α-methylcyclohexyl)-phenol is replaced by an equimolecular amount of 4-amino-2,6-di-(α-phenylethyl)-phenol, and otherwise the same procedure is followed, phosphoric acid diphenyl ester 3,5-di-(α-phenylethyl)-4-hydroxyanilide is obtained.

EXAMPLE 10

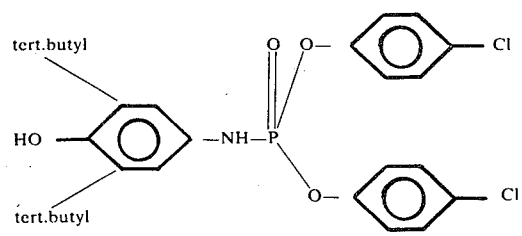

34 g of phosphoric acid bis-(4-chlorophenyl ester) chloride are added dropwise to a solution of 22.1 g of 4-amino-2,6-di-ter.butyl-phenol and 11 g of triethylamine in 200 ml of isopropyl alcohol at room temperature. The reaction mixture is stirred for 1 hour at 50°C and is poured out into 500 ml of water. The solid which precipitates is filtered off, dried and subsequently recrystallised from ligroin. This gives phosphoric acid bis-(4-chlorophenyl ester) 3,5-di-tert.butyl-4-hydroxyanilide of melting point 138°C.

If, in this example, the phosphoric acid bis-(4-chlorophenyl ester) chloride is replaced by an equivalent amount of phosphoric acid bis-(4-tert. butylphenyl ester) chloride, and otherwise the same procedure is followed, phosphoric acid bis-(4-tert.butylphenyl ester)-3,5-di-tert. butyl-4-hydroxyanilide is obtained.

EXAMPLE 11

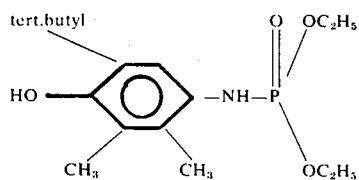

The procedure of Example 1 is repeated, replacing 4-amino-2,6-di-tert.butylphenol by an equivalent amount of 4-amino-6-tert.butyl-2,3-dimethyphenol. This gives phosphoric acid diethyl ester 2,3-dimethyl-4-hdyroxy-5-tert.butyl-anilide.

EXAMPLE 12 TO 22

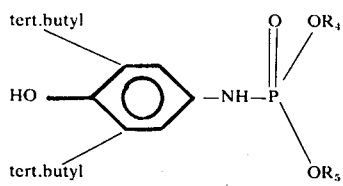

The procedure of Example 1 is repeated, replacing the phosphoric acid diethyl ester chloride by and equivalent amount of one of the ester chlorides of Table 2 below. This gives the corresponding ester anilides of the above formula, having the melting points shown.

Table 2

| Example No. | $R_4/R_5$ | Melting point |
|---|---|---|
| 12 | $R_4+R_5$ <br> $-CH_2$ $\diagdown$ $\diagup$ $CH_3$ <br> $\phantom{xxxxx}$ C <br> $-CH_2$ $\diagup$ $\diagdown$ $CH_3$ | 268°C |
| 13 | $R_4+R_5$ <br> $-CH_2$ $\diagdown$ <br> $\phantom{xxxxxxx}$ $CH_2$ <br> $-CH$ $\diagup$ <br> $\phantom{x}$ \| <br> $\phantom{x}$ $CH_3$ | 260°C |
| 14 | $R_4+R_5$ <br> $-CH_2$ $\diagdown$ <br> $\phantom{xxxxxxx}$ $CH_2-C_2H_5$ <br> $-CH$ $\diagup$ <br> $\phantom{x}$ \| <br> $\phantom{x}$ $C_3H_7$ | resin |
| 15 | $R_4=R_5$ <br> $n-C_{18}H_{37}$ | 88°C |
| 16 | $R_4=R_5$ <br> $\phantom{xx}$ $\diagup CH_3$ <br> $-CH$ <br> $\phantom{xx}$ $\diagdown CH_3$ | 158°C |
| 17 | $R_4=R_5$ <br> $\phantom{xxxxxxx}$ $\diagup CH_3$ <br> $-CH_2-CH$ <br> $\phantom{xxxxxxx}$ $\diagdown CH_3$ | 178°C |
| 18 | $R_4=R_5$ <br> $\phantom{xx}$ $\diagup CH_3$ <br> $-CH$ <br> $\phantom{xx}$ $\diagdown C_2H_5$ | 134°C |
| 19 | $R_4=R_5$ <br> $-n-C_5H_{11}$ | 80°C |
| 20 | $R_4=R_5$ <br> $-CH_2COOC_2H_5$ | fluid* |
| 21 | $R_4=R_5$ <br> $-C_3H_7$ | 164°C |
| 22 | $R_4=R_5$ <br> $\phantom{xxxxxxxxx}$ $\diagup CH_3$ <br> $-CH_2CH_2-CH$ <br> $\phantom{xxxxxxxxx}$ $\diagdown CH_3$ | 132°C |

*Analysis
Calculated  C 55.9   H 7.6   N 9.9   P 6.5
Found       55.43    7.73    2.89    6.53

EXAMPLE 23

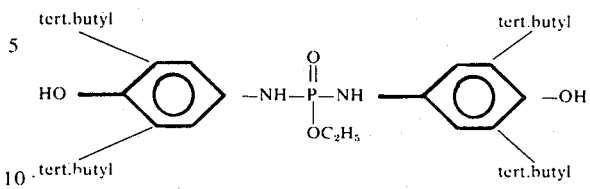

200 ml of dimethylformamide and 11 g of triethylamine are initially introduced into the reaction vessel, 22.1 g of 4-amino-2,6-di-tert.butylphenol are added and 8.15 g of phosphoric acid monethyl ester dichloride are then added dropwise at room temperature, whilst stirring. A precipitate results. The reaction mixture is stirred for a further hour and is poured into 600 ml of water. The amorphous mass which precipitates crystallises slowly. It is isolated, dried and purified by recrystallisation from cyclohexane. The resulting phosphoric acid monoethyl ester di-3,5-di-tert.butyl-4-hydroxy-anilide melts at 130°C.

EXAMPLE 24

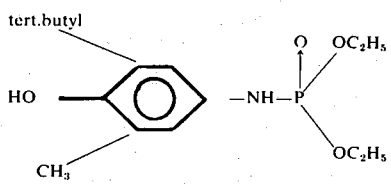

10.0 g of 4-amino-2-tert.butyl-6-methylphenol are initially introduced into 100 ml of dimethylformamide, and 5.9 g of triethylamine are added to the solution followed by 10.1 g of phosphoric acid diethyl ester chloride added at room temperature over the course of 15 minutes. A precipitate forms immediately, an exothermic reaction taking place. The mixture is stirred for a further 15 minutes and then poured into 500 ml of ice water. The product which initially is obtained as an oil crystallises over the course of one hour. It is filtered off, dried and recrystallised first from ligroin and then from toluene. This gives phosphoric acid diethyl ester 3-tert.butyl-4-hydroxy-5-methyl-anilide of melting point 151°C.

EXAMPLE 25

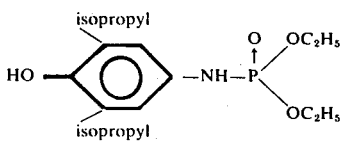

10.0 g of 4-amino-2,6-diisopropylphenol are initially introduced into 100 ml of dimethylformamide, and 5.9 g of triethylamine are added to the solution followed by 10.1 g of phosphoric acid diethyl ester chloride added at room temperature over the course of 15 minutes. A precipitate forms immediately, an exothermic reaction taking place. The mixture is stirred for a further 15 minutes and poured into 500 ml of ice water. The product which initially is obtained as an oil crystallises over the course of one hour. It is filtered off, dried and recrystallised first from ligroin and then from toluene.

This gives phosphoric acid diethyl ester 4-hydroxy-3,5-diisopropylanilide of melting point 158°C.

EXAMPLE 26

Stabilisation of polybutadiene rubber a. Preparation of the test specimens 100 parts of polybutadiene ("Solprene 201" of Messrs. Phillips) which has been stabilised beforehand with 0.75% of 2,6-di-tert.butyl-p-cresol and 0.5% of tris-nonylphenyl phosphite are additionally homogenised with 0.125 part of one of the stabilisers indicated in Table 3, for 10 minutes in a Brabender plastograph at 150°C and 60 revolutions per minute. The mixtures stabilised in this way are pressed in a platen press at 120°C for 5 minutes to give 0.625 mm thick sheets. The unstabilised rubber sheet which is used for comparison is prepared in the same manner.

b. Test

The gel content found after storage in air at elevated temperatures serves as the criterion of the protective action of the stabilisers incorporated. For this purpose, the test specimens obtained above are kept on an aluminium underlay in a circulating air oven at 100°C and are examined periodically (approx. every 10 hours) for their gel content, which is determined as follows:

About 1 g of the samples is cut into pieces of approx. 3×3×1 mm and these are dissolved overnight in 100 ml of n-hexane at room temperature. These solutions are filtered through glass wool, the gel particles retained by the glass wool are rinsed with 3 times 20 ml of n-hexane, the filtered solutions are evaporated to dryness and the residue is dried to constant weight. The gel content of a sample is then obtained from the following calculation:

$$\text{Gel content in \%} = [(E-A)/E] \cdot 100$$

Herein, E denotes the total weight of the sample examined and A denotes the weight of the dissolved portion of the sample examined.

The end point is defined as the time after which a sudden rise in the gel content to above 15% occurs after an induction period which is characteristic of the additive investigated.

Table 3

| Stabiliser from Example No. (0.125%) | Induction period up to the rapid occurrence of a gel content of above 15% |
|---|---|
| Without stabiliser | 5 hours |
| 1 | 230 " |
| 2 | 200 " |
| 3 | 230 " |
| 4 | 230 " |
| 5 | 215 " |
| 6 | 249 " |
| 7 | 240 " |
| 8 | 220 " |
| 10 | 190 " |
| 12 | 210 " |
| 13 | 230 " |
| 14 | 170 " |
| 15 | 185 " |
| 16 | 235 " |
| 17 | 222 " |
| 18 | 242 " |
| 19 | 260 " |
| 20 | 217 " |
| 21 | 235 " |
| 22 | 224 " |
| 23 | 190 " |

EXAMPLE 27

The test specimens described in Example 26 are in addition tested for their colour stability after the aging times indicated in Table 4, using, as a measure of yellowing, the "Gardner" scale for which zero denotes colourless and the numbers 1 to 18 denote progressively stronger yellowing.

Table 4

| Stabiliser from Example No. | Gardner colour index after hours | | | | |
|---|---|---|---|---|---|
| | 0 | 50 | 90 | 140 | 190 |
| Without stabiliser | 0 | 7 | 7 | 8 | 10 |
| 1 | 0 | 0 | 0 | 0 | 0 |
| 2 | 0 | 0 | 0 | 1 | 2 |
| 3 | 2 | 2 | 2 | 2 | 2 |
| 4 | 4 | 4 | 4 | 4 | 4 |
| 5 | 0 | 0 | 0 | 1 | 1 |
| 6 | 0 | 0 | 0 | 0 | 0 |
| 7 | 0 | 0 | 0 | 0 | 0 |
| 8 | 0 | 0 | 0 | 0 | 0 |
| 10 | 0 | 0 | 0 | 0 | 0 |
| 12 | 2 | 2 | 3 | 3 | 3 |
| 13 | 2 | 2 | 2 | 3 | 3 |
| 14 | 3 | 3 | 3 | 4 | 4 |
| 15 | 5 | 5 | 5 | 5 | 5 |
| 16 | 0 | 0 | 0 | 0 | 0 |
| 17 | 0 | 0 | 0 | 0 | 0 |
| 18 | 0 | 0 | 0 | 0 | 0 |
| 19 | 0 | 0 | 0 | 0 | 0 |
| 20 | 4 | 4 | 4 | 5 | 5 |
| 21 | 0 | 0 | 0 | 0 | 0 |
| 22 | 0 | 0 | 0 | 0 | 0 |

EXAMPLE 28

The test specimens described in Example 26 are in addition exposed for 300 hours in a "Xenon Weather-O-meter" and are examined for their colour stability after the exposure times indicated in Table 5, using, as a measure of yellowing, the Gardner scale, in which zero denotes colourless and the numbers 1 to 18 denotes progressively stronger yellowing.

Table 5

| Stabiliser from Example No. | Gardner colour index after hours exposure time | |
|---|---|---|
| | 20 | 310 |
| Without stabiliser | 0 | 1 |
| 1 | 1 | 0 |
| 2 | 3 | 5 |
| 3 | 2 | 2 |
| 4 | 5 | 5 |
| 5 | 4 | 6 |
| 6 | 0 | 0 |
| 7 | 1 | 1 |
| 8 | 1 | 0 |
| 10 | 1 | 1 |
| 12 | 2 | 4 |
| 13 | 3 | 5 |
| 14 | 3 | 5 |
| 15 | 5 | 5 |
| 16 | 0 | 1 |
| 17 | 0 | 0 |
| 18 | 0 | 1 |
| 19 | 2 | 2 |
| 20 | 2 | 4 |
| 21 | 0 | 0 |
| 22 | 1 | 1 |

EXAMPLE 29

Stabilisation of styrene-butadiene copolymer (SBR)

a. Preparation of the test specimens 100 parts of an unstabilised styrene-butadiene-rubber ("Synpol 1,500" SBR-emulsion from Texas U.S. Chem. Corp.) are homogenised with 0.125 part of one of the stabilisers indicated in Table 6 in a Brabender plastograph for 10 minutes at 150°C and 60 revolutions per minute. The mixtures stabilised in this way are pressed in a platen press at 120°C for 5 minutes to give 0.625 mm thick sheets. The unstabilised rubber sheet which serves for comparison is prepared in the same manner.

b. Test

The gel content found after storage in air at elevated temperatures serves as the criterion of the protective action of the stabilisers incorporated. For this purpose, the test specimens, obtained above are kept on an aluminum underlay in a circulating air over at 100°C and are examined periodically (approx. every 10 hours) for their gel content, which is determined as follows:

About 1 g of the samples is cut into pieces of approx. 3×3×1 mm and these are dissolved overnight in 100 ml of n-hexane at room temperature. These solutions are filtered glass wool, the gel particles retained by the glass wool are rinsed with 3 time 20 ml of n-hexane, the filtered solutions are evaporated to dryness and the residue is dried to constant weight. The gel content of a sample is then obtained from the following calculation:

Gel content in % = $[(E-A)/E]$ 100

Herein, E denotes the total weight of the sample examined and A denotes the weight of the dissolved portion of the sample examined.

The end point is defined as the time after which a sudden rise in the gel content occurs after an induction period which is characteristic of the additive investigated. (Table 6).

Table 6

| Stabiliser from Example No. (0.125%) Without stabiliser | Induction period up to the rapid occurrence of a high gel content |
|---|---|
|  | 12 hours |
| 1 | 173 hours |
| 3 | 190 " |
| 6 | 180 " |

EXAMPLE 30

Stabilisation of EPDM a. Preparation of the test specimens 100 parts of unstabilised ethylene-propylene rubber are homogenised with 0.1 part of one of the stabilisers indicated in Table 7 in a Brabender plastograph, equipped with a type 50 EC roller kneader, for 10 minutes at 150°C and 60 revolutions per minute. The mixtures stabilised in this way are pressed in a platen press at 1200°C for 5 minutes to give 1 mm thick sheets. The unstabilised rubber sheet which serves for comparison is prepared in the same manner.

b. Test

The gel content found after storage in air at elevated temperatures serves as the criterion of the protective action of the stabilisers incorporated. For this purpose, the test specimens obtained above are kept on an aluminium underlay in a circulating air oven at 100°C and are examined (after 5 to 10 days) for their gel content, which is determined as follows:

About 1 g of the samples is cut into pieces of approx. 3×3×1 mm and these are dissolved overnight in 100 ml of n-hexane at room temperature. These solutions are filtered through glass wool, the gel particles retained by the glass wool are rinsed with 3 times 20 ml of n-hexane, the filtered solutions are evaporated to dryness and the residue is dried to constant weight. The gel content of a sample is then obtained from the following calculation:

Gel content in % = $[E-A)/E]$. 100

Herein, E denotes the total weight of the sample examined and A denotes the weight of the dissolved portion of the sample examined.

The end point is defined as the time after which a sudden rise in the gel content occurs after an induction period which is characteristic of the additive investigated. (Table 7).

Table 7

| Stabiliser from Example No. Without stabiliser | Induction period up to the rapid occurrence of a high gel content |
|---|---|
|  | 100 hours |
| 1 | 1,900 hours |
| 3 | 2,100 " |

EXAMPLE 31

Stabilisation of Polypropylene 100 parts of polypropylene (melt index 3.2 g/10 minutes, 230°C/2,160 g) are thoroughly mixed for 10 minutes, in a shaking apparatus, with 0.2 part of one of the additives listed in Table 8 below.

The resulting mixtures are kneaded in a Brabender plastograph at 200°C for 10 minutes and the mass thus obtained is subsequently pressed in a platen press at 260°C platen temperature to give 1 mm thick sheets from which strips 1 cm wide and 17 cm long are punched.

The activity of the additives added to the test strips is tested by heat aging in a circulating air oven at 135°C and 149°C, using an additive-free test strip for comparison. 3 test strips of each formulation are employed. The incipient, easily visible decomposition of the test strip is defined as the end point. The results are quoted in days.

Table 8

| Stabiliser from Example No. | Days to reach incipient decomposition | |
|---|---|---|
|  | 149°C | 135°C |
| Without additive | ½ | 1 |
| 2 | 12 | 65 |
| 5 | 18 | 45 |
| 7 | 12 | 48 |

EXAMPLE 32

Shavings (chips) 25 μ thick are cut with the aid of a microtome from the 1 mm thick test sheets described in Example 31. These chips are clamped between stainless steel grids and the sample carriers thus obtained are suspended in a circulating air oven and aged at 135°C or 147°C. The end point is defined as the time after which degraded polypropylene falls out in the form of a powder on gently tapping the grids (a check being carried out once or twice daily). The results are quoted in hours.

Table 9

| Stabiliser from Example No. | Hours to reach incipient decomposition | |
|---|---|---|
| | 147°C | 135°C |
| Without additive | 10 | 20 |
| 2 | 60 | 160 |
| 5 | 70 | 260 |
| 7 | 90 | 310 |

EXAMPLE 33

100 parts of polypropylene (melt index 3.2 g/10 minutes, 230°C/2,160 g) are thoroughly mixed with 0.1 part of the additives listed in Table 10 below and 0.3 part of thiodipropionic acid dilauryl ester for 10 minutes in a shaking apparatus. The resulting mixtures are kneaded for 10 minutes in a Brabender plastograph at 200°C and the composition thus obtained is subsequently pressed in a platen press at 260°C platen temperature to give 1 mm thick sheets from which strips 1 cm wide and 17 cm long are punched. Shavings (chips) 25 82 thick are cut from the sheets with the aid of a microtome.

These chips are clamped between stainless steel grids and the sample carriers thus obtained are suspended in a circulating air oven and aged at 135°C or 147°C. The end point is defined as the time after which degraded polypropylene falls out in the form of a powder on gently tapping the grids (a check being carried out once or twice daily). The results are quoted in hours.

Table 10

| Stabiliser from Example No. | Hours to reach incipient decomposition | |
|---|---|---|
| | 147°C | 135°C |
| Without additive | 10 | 20 |
| 2 | 60 | 200 |
| 5 | 90 | 280 |
| 7 | 120 | 350 |

EXAMPLE 34

Stabilisation of Polyacetal 100 parts of unstabilised formaldehyde/ethylene oxide copolymer (copolyacetal of Messrs. Ficona, Italy) are mixed with 1.5 parts of calcium stearate and 0.2 part of one of the additives mentioned in Table 11 below, the mixture is worked for 15 minutes on a two-roll mill and the mill hide is pulled off. 10 mg portion of the stabilised samples are heated to 220°C on the pan of a sensitive thermo-balance. The weight loss of the samples, which indicates the progressive aging, is recorded continuously.

Table 11

| Stabiliser from Example No. | Weight loss in % after | | |
|---|---|---|---|
| | 5 mins. | 10 mins. | 15 mins |
| Without stabiliser | 21 | 33 | >40 |
| 1 | 1 | 3 | 15 |
| 3 | 1 | 5 | 19 |

EXAMPLE 35

Stabilisation of Polyamide

The additives listed in Table 12 are sprinkled dry, at a concentration of 0.5%, onto dried polyamide 6 granules (relatively viscosity =2.9, 1% strength in concentrated sulphuric acid) and the sprinkled mixtures are regranulated on a single-screw extruder at 260°C. 0.3 mm pressed films are then produced from the granules, again at 260°C, and 1 cm wide test strips are punched from these pressed films. The activity of the additives added to the test specimens is tested by heat aging in a circulating air oven at 165°C. The thermo-oxidation degradation of the material during heat aging is followed by periodically measuring the relative viscosity of a 1% strength solution in 96% strength sulphuric acid, and determining the time after which the relative viscosity falls from 2.9 to a value of 2.0. (Table 12).

Table 12

| Stabiliser from Example No. | Heat aging time at 165°C for the relative solution viscosities to decrease from 2.9 to 2.0, in hours |
|---|---|
| Without additive | 16 |
| 1 | 60 |
| 3 | 60 |

EXAMPLE 36

Stabilisation of mineral oil 0.2 g of the stabiliser from Example No. 3 is dissolved in 50 ml of mineral oil (solvent refined paraffinic base oil HVI 65-LP509, Shell). The mixture, together with 5 ml of distilled water and a piece of highly purified copper wire, is introduced into a glass-lined autoclave. The autoclave is closed and set to a pressure of 6.3 atmospheres gauge by means of oxygen. The entire autoclave is then immersed in an oil bath preheated to 150°C and is rotated at 100 revolutions per minute, with the axis of rotation at an angle of 30° to the horizontal. The maximum pressure of 13 atmospheres gauge is noted and the time over which the pressure declines by 1.75 atmospheres gauge from its maximum value is observed (Table 13).

An experiment in which no stabiliser is added is carried out at the same time. The activity of the stabiliser manifests itself in a slower decrease in pressure, that is to say a longer test time (= working life).

Table 13

| Unstabilised sample | Working life |
|---|---|
| Unstabilised sample | 26 minutes |
| Stabilised sample | 137 minutes |

EXAMPLE 37

Stabilisation of polybutadiene rubber 100 parts of polybutadiene ("Solprene 250° of Messrs. Phillips) which has beforehand been stabilised with 0.75% of 2,6-di-tert.butyl-p-cresol are additionally kneaded with 0.1 part of one of the stabilisers indicated in Table 14 for 30 minutes in a Brabender plastograph at 150°c and 60 revolutions per minute. During this time, the resistance to kneading, in the form of a torque, is recorded continuously. Because of the initially occurring crosslinking and subsequent degradation, a maximun torque occurs. The activity of the stabilisers manifests itself in a lowering of the maximum torque.

The gel content determined after the Brabender treatment serves as a further criterion of the protective action of the stabilisers incorporated. For this purpose, 1 g of the sample is dissolved in 100 ml of toluene overnight at room temperature. These solutions are filtered through glass wool, the retained gel particles are rinsed with a little toluene, the filtered solutions are evaporated to dryness and the residue is dried to constant weight. The gel content of a sample is obtained from the following calculation:

Gel content in % = [(E−A)/E]. 100

Herein E denotes the total weight of the sample examined and A denotes the weight of the dissolved portion.

Table 14

| Stabiliser from Example No. | Maximum torque in gram × metre | Gel content after 30 minutes, % |
|---|---|---|
| Without stabiliser | 3,625 | 44 |
| 1 | 2,375 | 0 |
| 3 | 2,410 | 0 |
| 8 | 2,350 | 0 |
| 16 | 2,470 | 0 |
| 24 | 2,600 | 0 |
| 25 | 2,875 | 10 |

EXAMPLE 38

Stabilisation of styrene-butadiene rubber (SBR)

100 parts of styrene-butadiene rubber (SBR 1,502 from Messrs. Hüls) are kneaded with 0.1 part of one of the stabilisers indicated in Example 15 for 30 minutes in a Brabender plastograph at 150°C and 60 revolutions per minute. During this time, the resistance to kneading, in the form of the torque, is recorded continuously. Because of the initially occurring crosslinking and subsequent degradation, a maximum torque occurs. The activity of the stabilisers manifests itself in a lowering of the maximum torque.

The gel content determined after the Brabender treatment serves as a further criterion of the protective action of the stabilisers incorporated. For this purpose, 1 g of the sample is dissolved in 100 ml of toluene overnight at room temperature. These solutions are filtered through glass wool, the retained gel particles are rinsed with a little toluene, the filtered solutions are evaporated to dryness and the residue is dried to consant weight. The gel content of a sample is obtained from the following calculation:

Gel content in % = [(E−A)/E]. 100

Herein E denotes the total weight of the sample examined and A denotes the weight of the dissolved portion.

Table 15

| Stabiliser from Example No. | Maximum torque in gram × metre | Gel content after 30 minutes, % |
|---|---|---|
| Without stabiliser | 2,925 | 47 |
| 1 | 2,250 | 3 |
| 24 | 2,740 | 30 |

We claim:

1. A compound of the formula

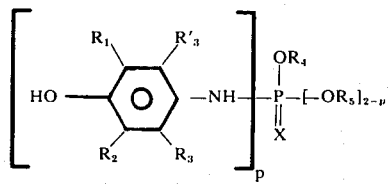

in which $R_1$ is a straight-chain or branched alkyl group with 1–8 carbon atoms, a cycloalkyl group with 6–8 carbon atoms, or an aralkyl group with 7–9 carbon atoms in which the aryl portion is phenyl, $R_2$ is hydrogen, a straight-chain or branched alkyl group with 1–8 carbon atoms, a cycloalkyl group with 6–8 carbon atoms or an aralkyl group with 7–9 carbon atoms, in which the aryl portion is phenyl, $R_3$ and $R_3'$ independently of one another are hydrogen or an alkyl group with 1–4 carbon atoms, $R_4$ and $R_5$ independently of one another are a straight-chain or branched alkyl group with 1–22 carbon atoms, a cycloalkyl group with 5–8 carbon atoms, a halogenalkyl group with 2–18 carbon atoms, an alkylthioalkyl group with 3–21 carbon atoms, an alkoxyalkyl group with 3–21 carbon atoms, an alkoxycarbonylalkyl group with 3–5 carbon atoms, an alkenylgroup with 3–4 carbon atoms, the phenyl-group, the chlorophenyl group, an alkylphenylgroup with 7–14 carbon atoms or an aralkyl group with 7–15 carbon atoms or $R_4$ and $R_5$ together are 1,2- or 1,3-alkylene or 2–8 carbon atoms, o-arylene with 6–10 carbon atoms or the

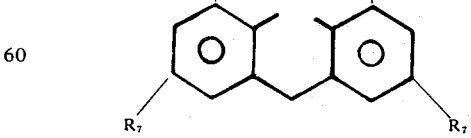

group wherein $R_6$ and $R_7$ are alkyl groups with 1–4 carbon atoms, X is oxygen or sulphur and p is 1 or 2.

2. Compounds according to claim 1, in which $R_3$ is hydrogen or methyl, $R_3'$ is hydrogen and $R_4$ and $R_5$ independently of one another are alkyl with 1 to 22 carbon atoms, cycloalkyl with 5 to 8 carbon atoms, halogenoalkyl with 2 to 18 carbon atoms, alkylthioalkyl with 3 to 21 carbon atoms, alkoxyalkyl with 3 to 21 carbon atoms, alkenyl with 3 or 4 carbon atoms, phenyl, alkylphenyl with 7 to 14 carbon atoms or aralkyl with 7 to 15 carbon atoms or $R_4$ and $R_5$ together are ethylene or o-phenylene.

3. Compounds according to claim 1 in which $R_1$ and $R_2$ independently of one another are alkyl with 1 to 5 carbon atoms, or cycloalkyl with 6 to 8 carbon atoms, $R_3$ is hydrogen or methyl, $R_3'$ is hydrogen, $R_4$ and $R_5$ are alkyl with 1 to 8 carbon atoms, cyclohexyl, phenyl, alkylphenyl with 7 to 14 carbon atoms, or benzyl, and $p$ is 1.

4. Compounds according to claim 1, in which $R_1$ is alkyl with 1 to 4 carbon atoms, $R_2$ is alkyl with 3 or 4 carbon atoms, $R_3$ and $R_3'$ are hydrogen, $R_4$ and $R_5$ are alkyl with 1 to 18 carbon atoms, phenyl, chlorophenyl, benzyl or —$CH_2COOC_2H_5$, and $R_4$ and $R_5$ together are ethylene.

5. Compounds according to claim 1, in which $R_1$ and $R_2$ independently of one another are isopropyl or tert.-butyl, $R_3$ and $R_3'$ are hydrogen, $R_4$ and $R_5$ are alkyl with 1 to 8 carbon atoms, cyclohexyl, phenyl, alkylphenyl with 7 to 10 carbon atoms or benzyl, and $p$ is 1.

6. A compound according to claim 1, of the formula

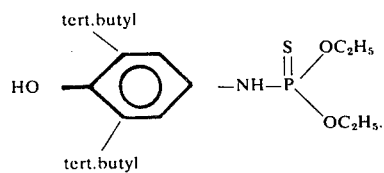

7. A compound according to claim 1, of the formula

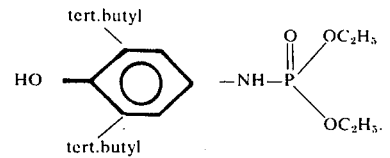

8. A compound according to claim 1, of the formula

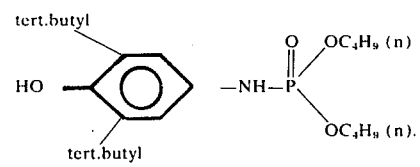

9. A compound according to claim 1, of the formula

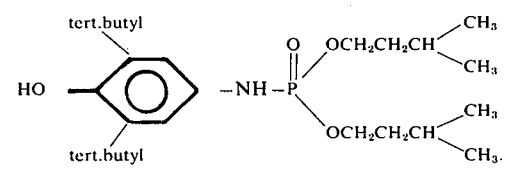

10. A compound according to claim 1, of the formula

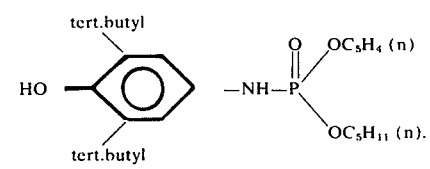

* * * * *